(No Model.) 6 Sheets—Sheet 6.
J. SHILLING, Sr.
APPARATUS FOR DIGGING WELLS, &c.
No. 307,343. Patented Oct. 28, 1884.
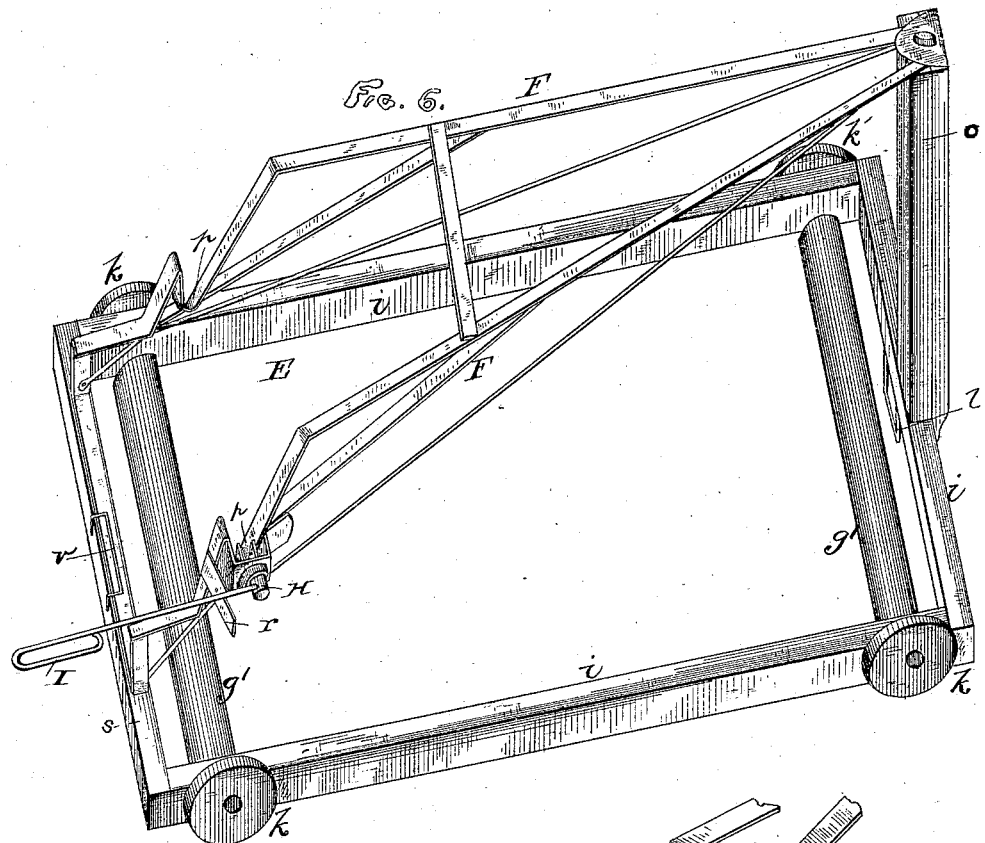
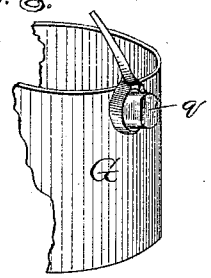
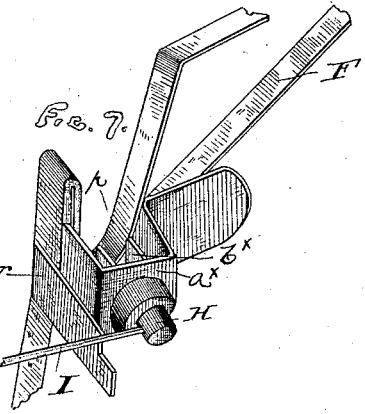

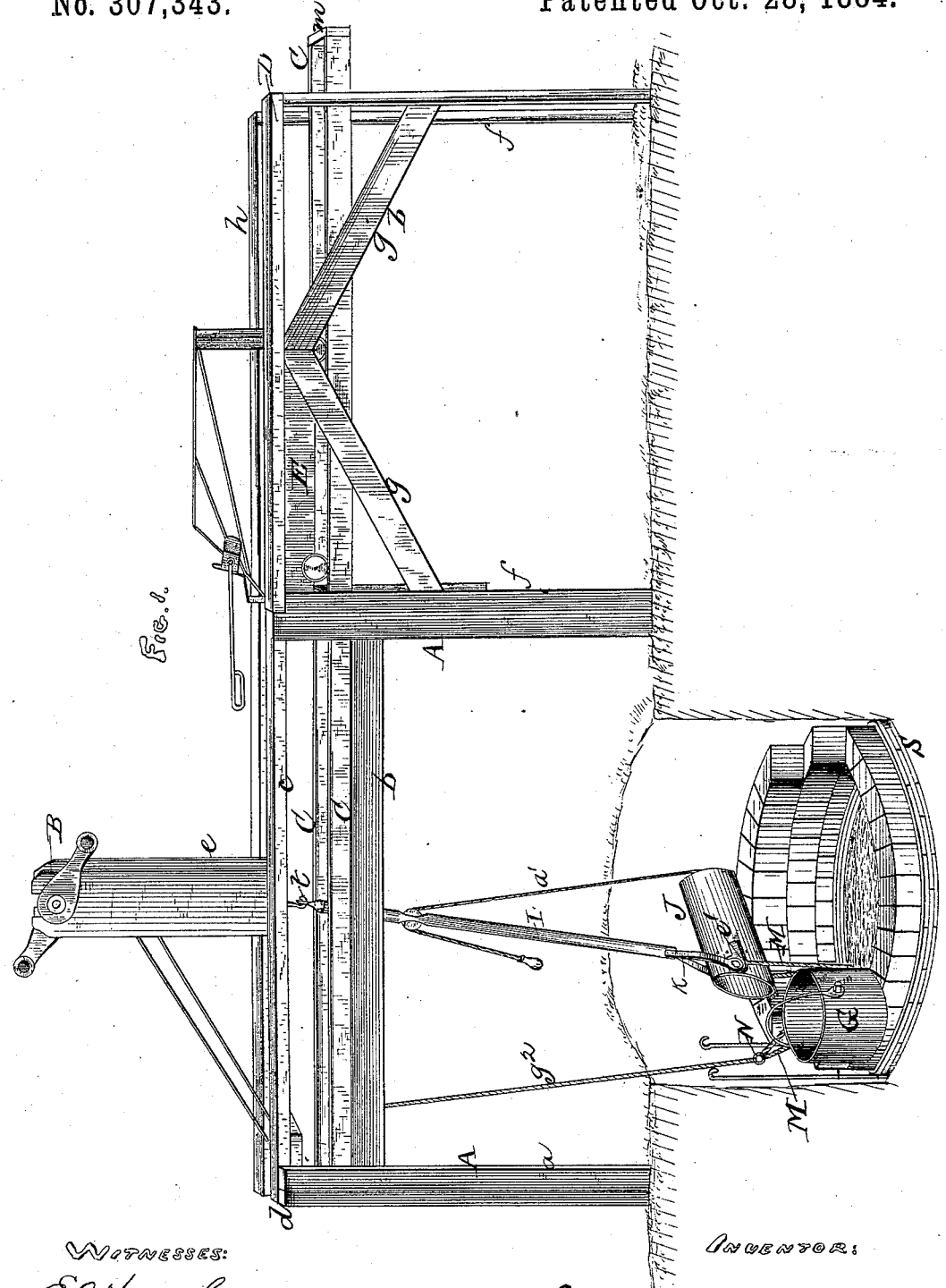

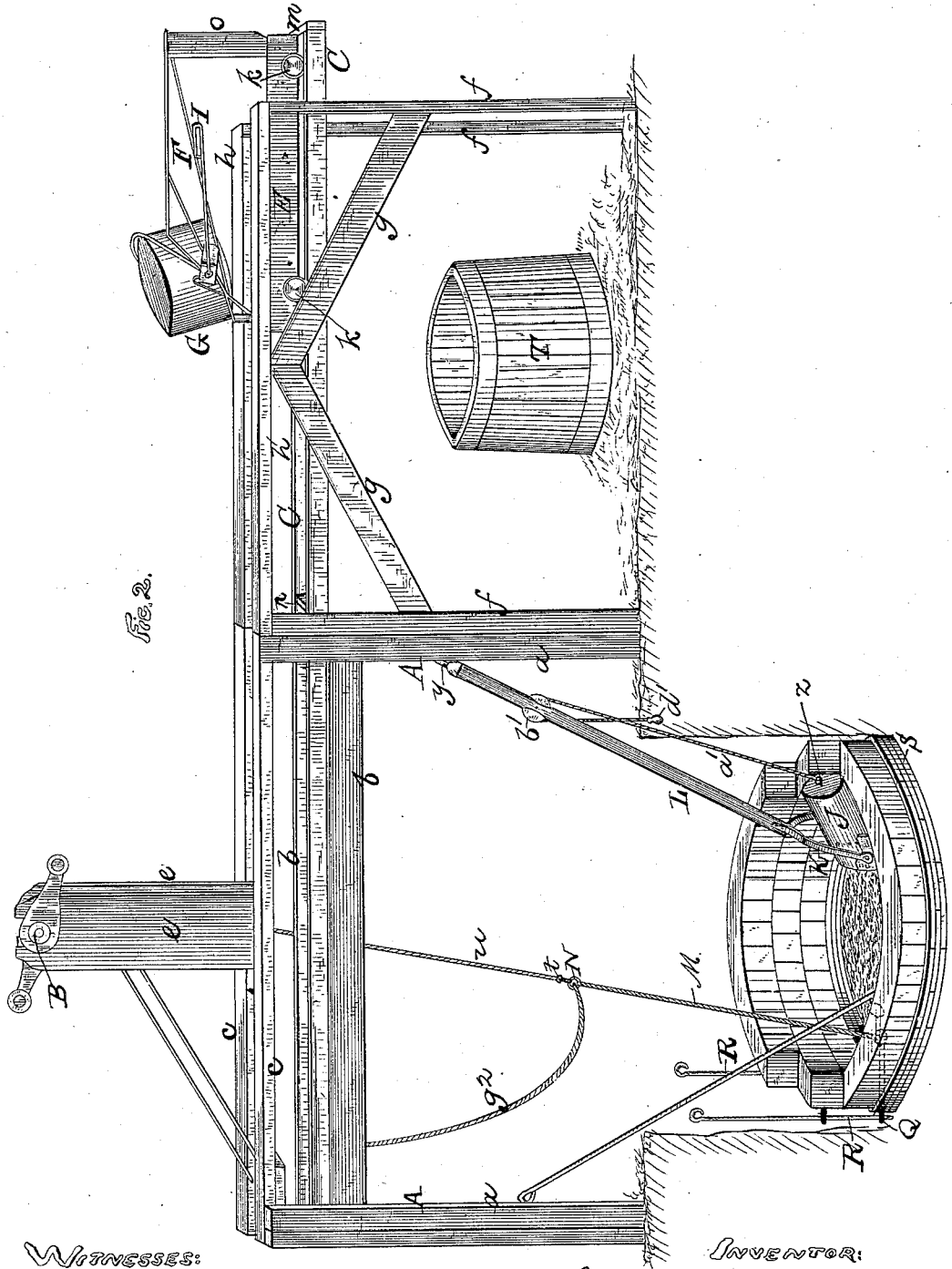

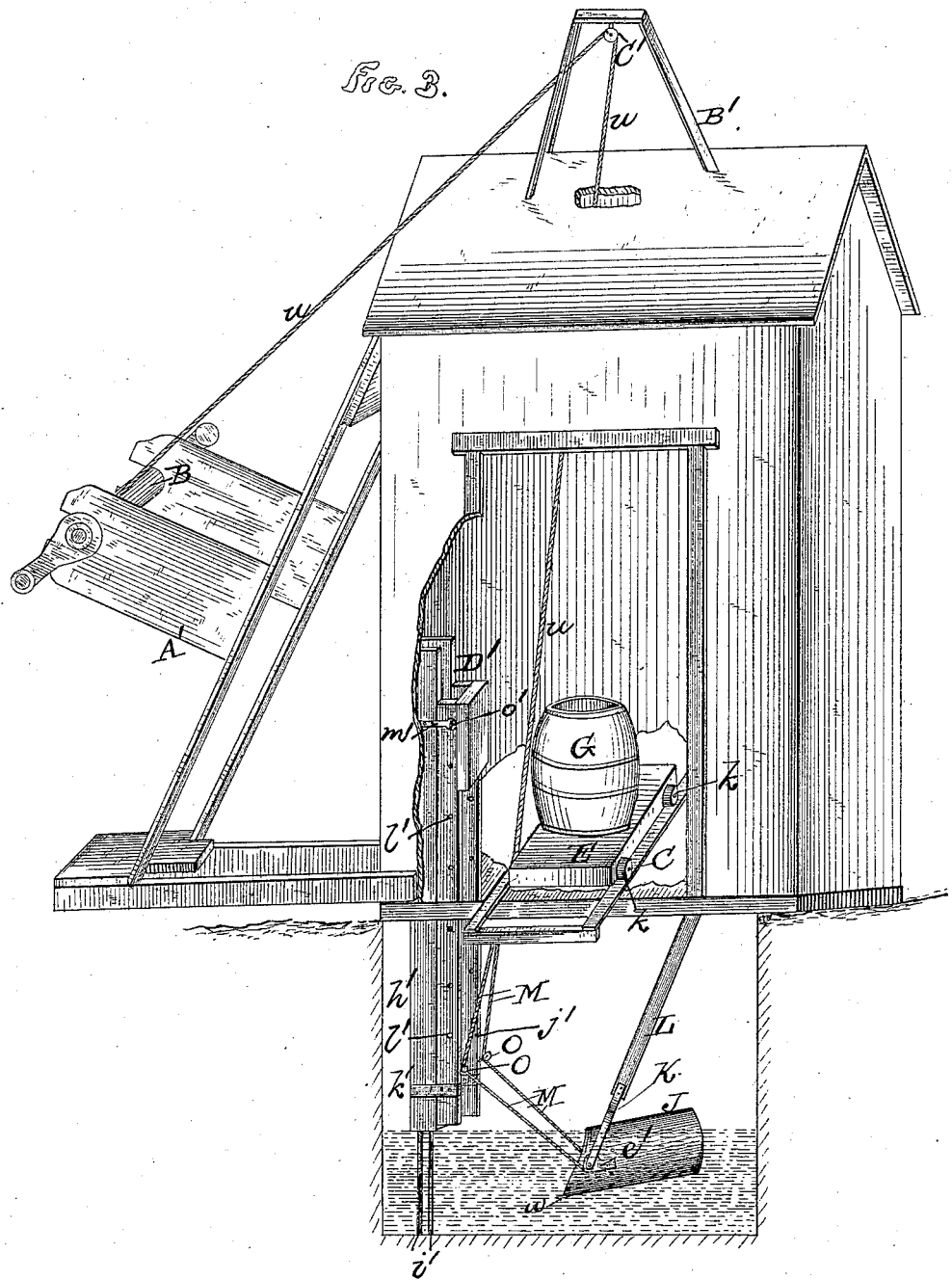

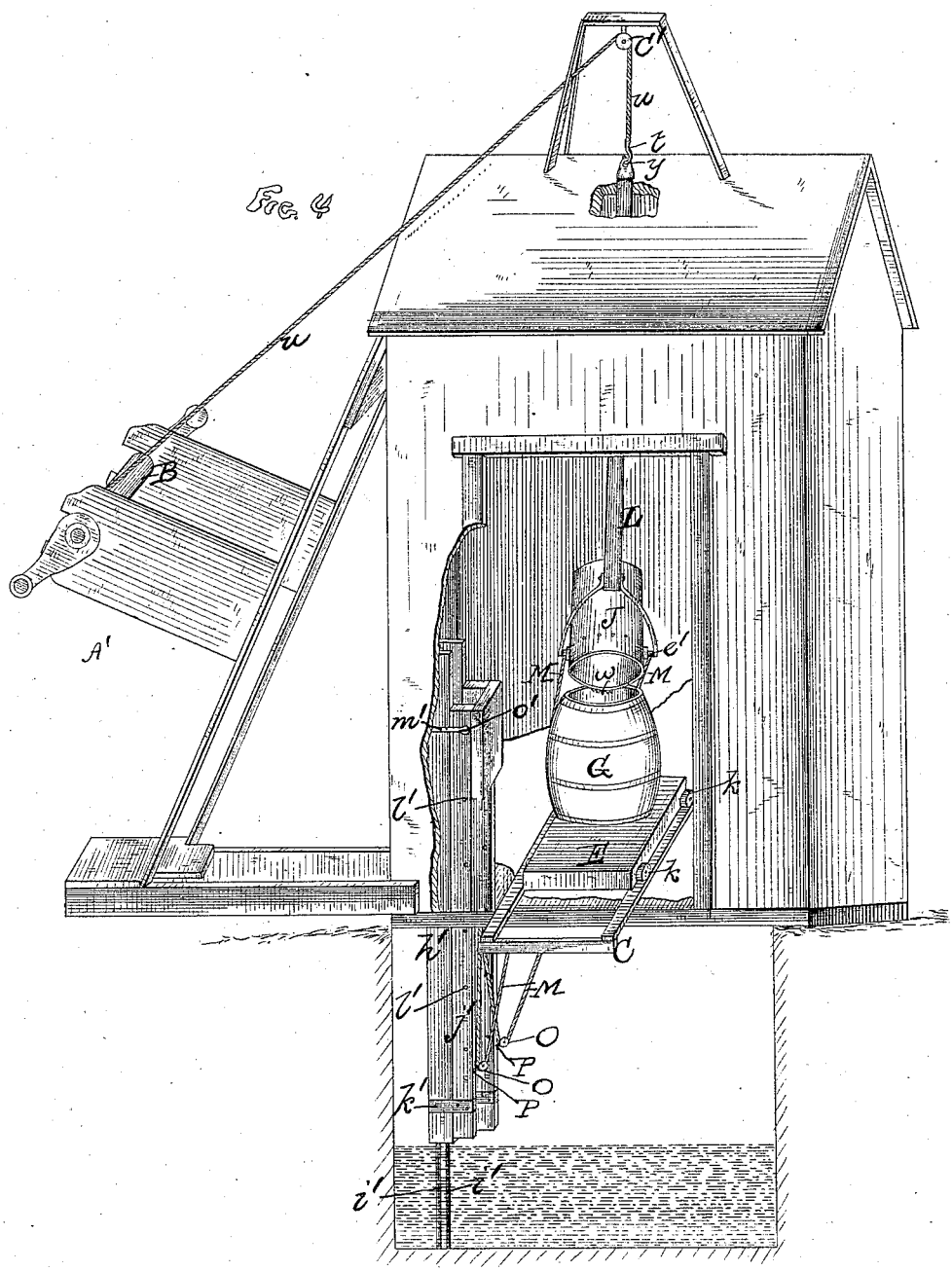

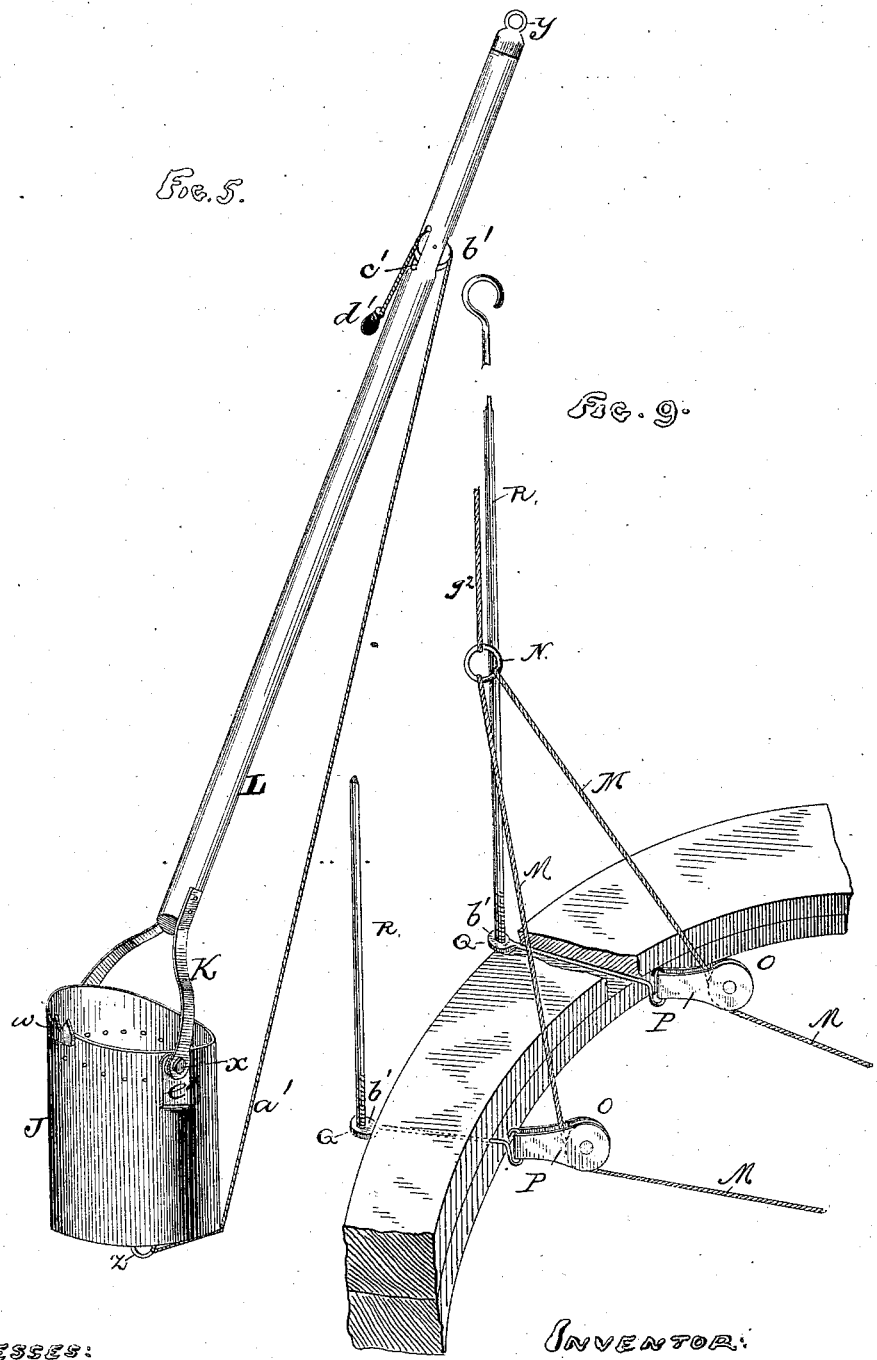

UNITED STATES PATENT OFFICE.

JESSE SHILLING, SR., OF TROY, OHIO, ASSIGNOR OF ONE-HALF TO JAMES H. YOUNG, OF SAME PLACE.

APPARATUS FOR DIGGING WELLS, &c.

SPECIFICATION forming part of Letters Patent No. 307,343, dated October 28, 1884.

Application filed December 15, 1883. (No model.)

*To all whom it may concern:*

Be it known that I, JESSE SHILLING, Sr., a citizen of the United States of America, residing at Troy, in the county of Miami and State of Ohio, have invented certain new and useful Improvements in Apparatus for Digging Wells, Emptying Cesspools, Vaults, &c., of which the following is a specification, reference being had therein to the accompanying drawings.

This invention consists in an improved apparatus for digging wells, emptying cesspools and vaults, and the like, and in the method of and apparatus for constructing well-shafts, all as hereinafter described and claimed.

In the accompanying drawings, Figure 1 represents a side elevation, partly in perspective, showing a portion of a well-curb, the framing for supporting the operative parts, and with the scoop in the act of discharging into the carrying-bucket. Fig. 2 represents a similar view after the carrying-bucket has been raised and transported by a sliding carriage to the dumping-place and dumped. Fig. 3 represents a side elevation, partly in perspective, of my apparatus as applied to the emptying of cesspools, the devices being shown as in the act of removing the contents of the vault. Fig. 4 represents a similar view with the scoop in the act of discharging into the traveling bucket. Fig. 5 represents in perspective the scoop and parts connected therewith. Fig. 6 represents in perspective the carriage. Fig. 7 represents in perspective a portion of the frame of the carriage. Fig. 8 represents in detail a portion of the bucket. Fig. 9 represents a detail view showing the sheave-pulleys and the manner of connecting them to the curbing of the well.

The customary method of digging wells is to excavate the gravel, and then fill a bucket therewith and draw the bucket up by a windlass, and then carry said bucket away by hand to the desired dumping-place. Usually wells are dug by men standing in the excavation and scooping the gravel up by the aid of a bent scoop-shovel. In such cases much of the work has to be done by the workmen while standing in the water. Sometimes a platform or rest for the workmen is used; but in either case the stone and gravel have to be excavated by hand by the aid of a shovel or scoop, which is not only a laborious but a tedious proceeding, and one unpleasant and injurious to the workmen.

It is the design of my invention to avoid these objections to the ordinary method, and to produce an apparatus by means of which wells may be expeditiously dug and built and the material moved from the excavation, and the contents of cesspools and the like readily removed therefrom.

I will now proceed to describe my invention in its application to the forming of wells, as shown in Figs. 1 and 2 of the drawings.

When the location at which the well is to be dug is ascertained, I construct a trestle, A, about six feet high and composed of the uprights or legs $a$, having suitable bracing beams, bars, or strips, $b$, and top bars, $c$, to which latter, at or near the end $d$ of the frame or trestle work A, are attached uprights $e$, within which the windlass B is supported and journaled.

C represents a track or way which extends in a horizontal direction from or near the point at which are the windlass-supporting uprights $e$ across the trestle or frame A, and beyond the same to a distance of from ten to thirty feet, more or less, according to the depth it is desired to dig the well—that is, the deeper the well has to be dug the longer will be the track, in order to provide adequate room or space within which the material excavated may be dumped.

D represents a horizontal extension of the trestle-work for the purpose of affording a support to the extended portion of the track, and serving as a guide for the carriage E, to be presently described. This extension D has suitable supports or legs, $f$, braces $g$, and top bars, $h$, which latter serve as guides for the carriage E during its movement along the outer portion of the track C.

The track C may extend beyond the extension D, as shown in the drawings, for the purpose of increasing the line of travel of the carriage E, and also increasing the area of the space within which the excavated material may be dumped. The legs or supports $a$ and $f$ can be either inserted in the ground or rest thereon, and be braced in position by any suitable or desired means. The carriage E (see Fig. 6) is composed of a rectangular framework, i, having at each end a cross-shaft, g', upon whose outer ends are mounted wheels or rollers k, which rest upon and travel along the track C, carrying with them said carriage.

l represents a lug, loop, or plate depending from the bottom of the rear portion of the carriage, which, when the carriage is pushed rearwardly along the track, comes in contact with a cross-bar, m, at the rear of said track, and limits the further movement of said carriage, to be presently described. When said carriage is drawn forward, said lug or stop l will come in contact with another cross-bar, n, when the carriage has reached the position at which the bucket will be beneath the windlass B.

o represents a post or standard extending upward from the rear of the carriage E, to whose upper end is pivoted the rear end of a frame, F, provided near its forward end with ears p, within which the trunnions q of the bucket G rest.

H represents a short shaft loosely mounted within a bracket, $a^{\times}$, on one side of the frame F, the inner end of said shaft or journal H projecting inwardly and having a recess or lugs, $b^{\times}$, adapted to embrace one of the trunnions q upon the bucket being placed within the ears p. To the outer end of this shaft or journal H is attached a handle or lever, I, by means of which said shaft or journal can be rocked or partly rotated, and as said handle is turned upwardly and forwardly it will rotate said shaft H and turn the bucket over and dump its contents in the manner shown in Fig. 2.

r represents a stop for supporting the handle in position of rest.

To the front end of the carriage E is attached a returned link or guard, v, which extends across the lower front end, s, of the carriage E, for the purpose of limiting the sidewise movement of said front end of the bucket-supporting frame F. The object of pivotally attaching the frame to the post o is to permit of the front end of said frame being swung sidewise in either direction, so as to bring it and the bucket to a position immediately beneath the hook t on the rope u, whatever its position on the barrel of the windlass may be, the sidewise movement of said frame being limited, and its movement too far in either direction stopped upon the upwardly-extending portion of the front part of said frame coming in contact with the guard v. The trunnions on the bucket are placed above the center, and the lever or handle I extends forward some distance and may be weighted at its forward end, by which means, upon said handle passing beyond a vertical position rearwardly, it will assist in turning the bucket over to dump its contents, and upon passing rearwardly beyond a vertical line it will assist the return of the bucket to a position of rest after dumping its contents.

J represents the scoop for excavating the gravel or other material when digging wells or for scooping the contents of cesspools, &c. This scoop is provided at its front edge with serrations or teeth, or has applied thereto a serrated plate, w, for the purpose of loosening the earth and facilitating the ready entrance therein of the scoop. This scoop is pivotally connected at x to the yoke K, to which is attached a handle, L, having at its upper end an eye, y, with which the hook t on the rope u engages when it is desired to raise said scoop from the excavation.

To the outside face of the bottom of the scoop J is an eye, z, to which is attached one end of a rope or chain, a', which rope or chain passes up to and over a sheave or pulley, b', journaled within a slot or recess, c', in the scoop-handle L. The opposite end of said rope or chain a' is either knotted or has attached thereto a button or handle, d', for the double purpose of retaining said rope or chain a' in position within the slot in the handle and upon the sheave or pulley b', and affording a means whereby the operator may draw downwardly upon that end of the rope or chain a', and thereby raise the bottom of the bucket, and consequently tilt the mouth thereof to the desired angle for scooping up the contents of the excavation or cesspool. By means of this rope a' the operator can also tilt the scoop to any desired position within the excavation, so as to permit of its scooping at either side or part thereof. By means of either this rope or handle L the operator can guide the scoop to the position desired and force it through the earth or other material to be excavated, he meanwhile retaining his hold upon the button d', and thereby holding the rope or chain a' taut and the scoop rigidly at the desired angle.

M represents a rope or ropes attached to ears or eyes e' on the trunnions or sides of the scoop J, said rope or ropes extending and connected to a ring, N, with which the hook t on the windlass-rope u is engaged when excavating.

O represents sheave-pulleys over which the rope or ropes M travel (see Fig. 9) during the several movements of the scoop. These pulleys are journaled in ears P, to whose rear ends are attached pins or links Q, each having a screw-threaded eye for the reception of the screw-threaded lower end of a retaining-rod, R.

S represents the foundation or platform for the stone wall of the well. This platform may be constructed of any suitable material and size, although I find it convenient and sufficient to form the same of three thicknesses of inch boards, and with the inner diameter corresponding with the diameter of the well when completed.

Where it is not desired or convenient to construct the wall of the well of stone or similar material, as shown in the drawings, I employ in lieu thereof a crib or wooden cylinder, T, which is placed within the excavation, with its lower edge resting upon the platform S. The sheave-pulleys O are removably attached to said platform, or to the crib T (shown on the right-hand side of Fig. 2) or other suitable support of sufficient depth, by passing the pins or links Q, to which said pulleys are attached, outward through the same, and then connecting the lower ends of the rods R with the outwardly-projecting ends of said pins Q. When it is desired to remove the pulleys from the excavation, the rods R are removed from the pins or links Q, and said pins drawn from their supports by simply pulling inward upon the rope M.

$g^2$ represents a rope attached at one end to the ring N, and at its other end to some suitable part of the framing or trestle, for the purpose of preventing said ring N and rope M dropping down when released from the hook $t$.

When it is not convenient or desirable to attach the sheave-pulleys O to either the platform or crib, they may be attached to an adjustable frame, D', which is composed of two uprights or standards adapted at their lower ends to enter the ground, one of said standards, to which the pulleys are attached, being vertically adjustable, in order that as the excavation proceeds said standard, with the pulleys thereon, may be lowered to maintain the sheave-pulleys O in operative position. The construction of this adjustable frame D' is hereinafter fully described.

When sufficient material has been gathered into the scoop, the operator releases his hold upon the rope or chain $a'$, whereupon the scoop will rotate on its pivots to a vertical position, and then the windlass is turned so as to bring the hook $t$ within reach of the operator, who places said hook $t$ in engagement with the eye $y$. Then the windlass is turned so as to bring said handle L, with its attached scoop J, until it reaches a position above the top of the bucket G, which in practice, when empty, rests upon the top of the well-curb or upon a board placed thereacross, upon which the operator or operators stand, or in any other suitable or convenient position. Then by pulling down upon the button $d'$ the scoop is tilted and its contents discharged into said bucket in the manner shown in Fig. 1. The operator then releases the handle L from contact with the hook $t$, and said handle and scoop are placed on one side, somewhat after the manner shown in Fig. 2. The rope $u$ is then lowered, the hook $t$ then engaged with the bail of the bucket G, and the windlass turned so as to raise such filled bucket up and in line with the carriage E, whereupon said bucket is guided to and dropped within the ears $p$ of the bucket-supporting frame F. The hook $t$ is then released from the bail of the bucket. The carriage E is then pushed along the track C to the position at which it is to dump the contents, and then, such position having been reached, the handle or lever I is grasped and turned upwardly and rearwardly, which act reverses the position of the bucket and dumps the contents thereof, as shown in Fig. 2. The carriage E, with the empty bucket thereon, is then drawn forward beneath the windlass, the handle I turned so as to bring the bucket back to an upright position, hook $t$ again engaged with the bail of the bucket, said windlass turned so as to cause the rope $u$ to wind thereon and draw the bucket from its supporting-ears $p$, and then the motion of the windlass reversed so as to uncoil the rope $u$ and lower the bucket to the desired position, in readiness for again being filled. In practice there will be one or more operators whose office it is to attend to the placing on and removal from the frame E of the bucket G, the manipulation of the carriage, and the dumping of said bucket and the operation of said windlass, and one or more operators to attend to the proper manipulation of the scoop.

In digging a well which is to be six feet in diameter when walled, I dig the well eleven feet in diameter until I come to water. Then I put down the platform S. Then I attach the sheave-pulleys, ropes, and scoop in position, as heretofore described. I then, when the crib T is not used, put on two courses of stone, which will be about eighteen inches high and one foot thick. Then I take a board or boards and place the same across the side of the wall, for supporting the bucket G, and upon which the operator or operators stand to hold the scoop-handle and to change the hook of the windlass-rope from the ring of the scoop-ropes to the eye $y$ in the top of the scoop-handle. This ring N is held by the small rope $g^2$, attached to the trestle-work above, which keeps it from dropping in the water, and yet has slack enough to allow the scoop to be drawn up high enough to empty gravel into the tub on the board. The rope $a'$, which is attached to the bottom of the scoop and runs through the sheave-pulley $b'$ in the scoop-handle L, enables the operator who holds the handle to adjust the scoop and set it mouth downward on the opposite side of the well from the pulleys, or in any desired position. Then the operator attaches the hook of the windlass-rope $u$ to the ring of the scoop-ropes, and the operator or operators above wind the rope over the windlass and pull the scoop across the well, and then they slack above and those below change the hook from the ring in the scoop-ropes to the ring in the scoop-handle, and the loaded scoop is drawn up and dumped in the bucket on the board by the man pulling the handle of the rope $a'$. The hook of the windlass-rope is then attached to the bail of the bucket and drawn up. The truck on the track is then run in and the tub is lowered into the frame F, and the truck is then run off and the gravel is dumped. By scooping out in the center the wall will sink down, and as it sinks down I keep putting on layers of stone, keeping the top above the level of the water and fill in back of the wall with gravel. When the wall has been sunk as deep in the water as desired, I unscrew the rods R, which hold the sheave-pulleys O in the platform or other position, in order to remove the pulleys and ropes. When the crib or large wooden cylinder is used, which is when the gravel is extremely coarse, said crib is sunk one foot under water, having laid one foot of wall on top of it. The rods R are then unscrewed, and the pulleys, ropes, and scoop removed, and the wall run up to the top of the well.

In cleaning out a cesspool or vault by means of the apparatus herein described, I take up a part of the floor, and take off a few shingles from the roof and make a hole in the sheeting. I then set the windlass-frame A' in front or at one side of the door, with the open end of the frame on the ground. I then put a trestle, B', on top of the building, with sheave-pulleys C' in top for the windlass-rope $u$ to work through to pull the scoop J across the vault and to pull it up to empty it into the barrel, which is upon the truck or carriage E, which is on the track C, which runs in and out of the door between the windlass-frame.

D' represents an adjustable frame which is composed of two uprights or standards, the outer one of which, $h'$, is the longer, and the legs of which are provided at their lower ends with iron points $i'$, which, when the frame is in position within the cesspool or vault, are forced into the ground, so as to secure a firm anchorage.

$j'$ represents the inner member of the frame D', and to each leg of which are attached the ends of a strap, $k'$, which embraces the adjacent legs of each member $h'$ $j'$, and loosely connects the same together at their front ends. One of the legs of the inner member, $j'$, of the frame D' is provided vertically with a series of holes, $l'$, and the corresponding leg of the outer member, $h'$, has attached thereto a strap, $m'$, which extends inwardly to the inner member, and has an eye or hole through which a pin or key, $o'$, is passed to and into the holes $l'$.

O' represents sheave-pulleys, which are attached to the legs of the inner member, $j'$, and which serve the same purpose as the sheave-pulleys O, heretofore described. As the contents of the cesspool or vault are extracted and the volume thereof lowered, the pin $o'$ is removed, the inner member, $j'$, pushed down, and the pin $o'$ replaced in position, so as to hold the two parts of the frame D securely in position. By this means the inner member of the frame can be readily adjusted vertically, so as to bring the pulleys $p'$ to the desired operative position, according to the depth of the cesspool and its contents. When the adjustable frame D' is placed in the vault or cesspool, and the legs which have the points pushed down through the contents of the vault until the points are driven into the ground, and the upper part of the outer member, $h'$, is secured to the side of the building, the two legs having the sheave-pulleys and ropes are then pushed down to the top of the contents of the vault. These legs are then fastened to the others by the pins $o'$, and then the contents are scooped out and emptied into the bucket above, as shown in Fig. 4.

The same method of operating the scoop is followed in emptying cesspools as has been described with reference to the excavating of wells.

Although I have shown and described the adjustable frame D' as adapted for supporting the sheave pulleys on which the scoop-ropes run when emptying cesspools and the like, still such frame and adjuncts can be similarly employed in digging wells, and are equally applicable thereto.

When the well has been dug or the cesspool emptied, the trestle-work and extension thereof, and the track and windlass-supporting frame, and the several other parts of the apparatus can be readily separated, so as to be packed together and readily transported from place to place, and again connected together into operative position whenever desired for digging another well or emptying another cesspool and the like.

Having thus described my invention, what I claim is—

1. In an apparatus for digging wells, emptying cesspools, and the like, a trestle or frame work for supporting the operative parts, removably connected together and having windlass-support at either side, a windlass supported by and journaled between said uprights, and a horizontal track extended beyond the trestle, and having suitable supports adapted to receive and guide a carriage for transporting a bucket or analogous receptacle from the excavation to the discharging point, and cross-bars $m$ $n$ at either end, and a bucket-transporting carriage having a lug or plate, $l$, depending from its rear end, substantially as and for the purpose set forth.

2. In an apparatus for digging wells, emptying cesspools, and the like, a trestle or frame work having a horizontal track, C, provided with cross-bars $m$ $n$ at either end, and a bucket-transporting carriage having a lug or plate, $l$, depending from its rear end, substantially as and for the purpose set forth.

3. The carriage E, having at its rear end an upwardly-extending post, $o$, and bucket supporting and receiving frame pivotally connected at its rear end to said post, and having a horizontal adjustment at its front end, substantially as and for the purpose set forth.

4. The bucket-supporting frame F, herein described, having at its forward end ears for receiving the bucket-trunnions, a rotatable shaft or journal, H, adapted to receive and hold the bucket-trunnions, and a lever or handle, I, attached to said shaft for the purpose of rotating said shaft and overturning the bucket and dumping its contents, substantially as set forth.

5. The scoop J, pivotally connected to a yoke, K, and having on its outside face an eye, $z$, the slotted scoop-handle L, having sheave or pulley $b'$ and eye $y$, the rope $a'$, and means for raising and lowering said handle and scoop, substantially as and for the purpose set forth.

6. The combination, with the scoop J, of the rope M, attached at one end to said scoop and adapted at its opposite end to connect with the windlass-rope, windlass B, rope $u$, having hook $t$, and suitable sheave-pulleys adapted to guide said rope M, substantially as and for the purpose set forth.

7. The sheave-pulleys O, journaled in ears P, pins or links Q, attached to the rear ends of said ears P and each having a screw-threaded eye, $f'$, and the rods R, adapted to engage said eyes $f'$ and secure the pulleys in position, with capability of ready removal, substantially as and for the purpose set forth.

8. The frame D', having a rigid member provided with anchoring-points, and a loose member adapted to slide vertically upon said rigid member, and having sheave-pulleys for supporting and guiding the scoop-ropes, substantially as set forth.

9. The combination of the vertically-adjustable frame D', having sheave-pulleys thereon, a framing or trestle for supporting and bracing the windlass-frame and operative parts, a windlass, B, having a rope, $u$, and hook $t$, scoop J K L, track C, and carriage E.

In testimony whereof I affix my signature in presence of two witnesses.

JESSE SHILLING, Sr.

Witnesses:
R. H. SUTHERLAND,
GEORGE GREEN.